United States Patent [19]

Coxon et al.

[11] 4,044,175
[45] Aug. 23, 1977

[54] METHOD OF RECYCLING POWDER COATINGS IN A PLURAL COATING OPERATION

[75] Inventors: J. Barton Coxon, Novi; Kenneth R. Ling, Detroit, both of Mich.

[73] Assignee: Ford Motor Company, Dearborn, Mich.

[21] Appl. No.: 626,691

[22] Filed: Oct. 29, 1975

[51] Int. Cl.² .......................... B05D 1/40; B05D 3/12
[52] U.S. Cl. ............................ 427/195; 118/310; 118/312; 118/326; 118/602; 427/345; 427/375; 427/407 R; 427/421; 427/424
[58] Field of Search .............. 427/195, 185, 421, 424, 427/425, 345, 407 R, 375; 118/602, 310, 311, 312, 326

[56] References Cited

U.S. PATENT DOCUMENTS

| | | | |
|---|---|---|---|
| 1,961,667 | 6/1934 | Johnson | 427/345 X |
| 3,077,422 | 2/1963 | Slatkin | 427/424 |
| 3,389,010 | 6/1968 | Burch | 427/345 X |
| 3,632,371 | 1/1972 | Mikulka | 427/345 X |
| 3,694,242 | 9/1972 | Ofner | 427/345 X |
| 3,911,161 | 10/1975 | Nord et al. | 427/345 X |
| 3,953,623 | 4/1976 | Das | 427/345 X |
| 3,973,056 | 8/1976 | Fessler et al. | 427/427 X |

FOREIGN PATENT DOCUMENTS

| | | | |
|---|---|---|---|
| 1,933,662 | 1/1970 | Germany | 427/195 |

*Primary Examiner*—Ronald H. Smith
*Assistant Examiner*—Shrive P. Beck
*Attorney, Agent, or Firm*—William E. Johnson; Keith L. Zerschling

[57] ABSTRACT

A method of painting an article with powder paint is disclosed. A first spray zone is established for applying an undercoat of paint on the article. The article is moved through the first spray zone and then the powder paint is fused thereon. A second spray zone is established for applying a topcoat of paint on the article. The article is moved through the second zone of powder paint and then the coating is fused thereon. The overspray from the second spray zone is collected and used as the powder paint in the first spray zone.

1 Claim, 1 Drawing Figure

U.S. Patent
Aug. 23, 1977
4,044,175
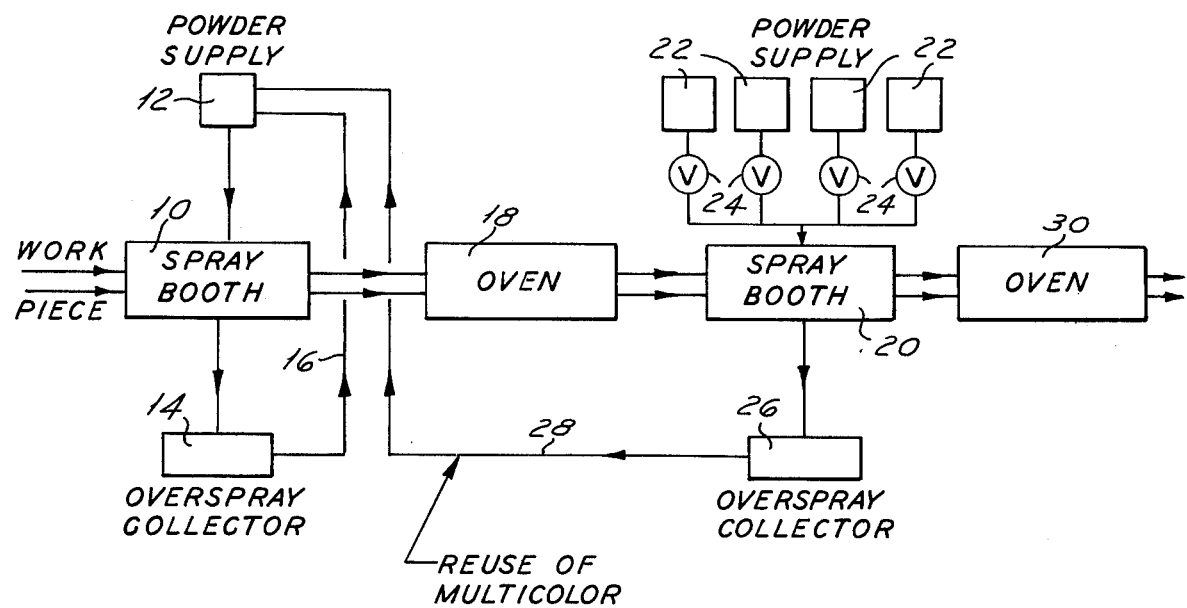

METHOD OF RECYCLING POWDER COATINGS IN A PLURAL COATING OPERATION

BACKGROUND OF THE INVENTION

In the application of a powder paint coating by electrostatic spray equipment, not all of the powder paint sprayed is deposited on the article to be painted. The undeposited powder is generally exhausted from the spray enclosure, removed from the air stream and collected. The prior art teaches that if a single color is used, the collected powder may be returned to the tank feeding the electrostatic spray gun for reuse. If multiple colors are sprayed in a single booth, the collected overspray cannot be reused because its color does not match any of the individual colors applied. The prior art teaches that this powder is simply collected and discarded.

It is a principal object of this invention to provide a use for the collected overspray of powder paints having a multiplicity of colors.

SUMMARY OF THE INVENTION

This invention is directed to a method of painting an article and, more particularly, to a method of painting an article with powder paint.

In accordance with the principal teachings of this invention, the method of painting an article is carried out in the following manner. A first spray zone of powder paint is established for applying an undercoat of paint on the article. The article is moved through the first spray zone to receive its undercoat. This undercoat is fused on the article after the article has been moved through the first spray zone. A second spray zone of powder paint is established for applying a topcoat of paint on the undercoated article. A powder paint having a desired topcoat color is selected from a plurality of available topcoat powder paints. The selected powder paint is fed to the established second spray zone. The article having the undercoat thereon is moved through the second spray zone. The topcoating applied to the article in the second spray zone is fused on the article after the article has been moved through the second spray zone. The overspray of the topcoat powder paint from the second spray zone is collected. This collected powder paint is sprayed as the undercoat powder paint in the first spray zone.

In accordance with further details of this method, the overspray of the first spray zone is also collected and resprayed in the first spray zone. The powder paints may be fused on the article by heating.

DESCRIPTION OF THE DRAWING

The FIGURE is a schematic diagram of the manner in which the method of this invention operates.

DESCRIPTION OF THE PREFERRED EMBODIMENT

Much commercial interest has been shown in recent years in the development of powder paints. Basically these paints are a fine powder which is sprayed on an article in a dry state. A few examples of powder paint formulas may be found in U.S. Pat. Nos. 3,730,930; 3,787,340; 3,787,520 and 3,787,521. Many other patents have also issued on powder paint formations. Once the powder has been applied to the article, the coating is fused on the article generally by heating the same. The resulting product has an appearance similar to an article which has been painted with a solvent base paint. In applying powder paints to mass produced articles, such as automobile body members, a number of different colors may be used. For example, in a typical auto painting operation, such colors as white, light blue, dark blue, lime, orange and red will be used in painting automobile members. In operating a spray booth, therefore, one must be able to change colors so that it is possible that each body member passing through the booth can be painted a different color than the previous body member.

Since powder paint is applied in a dry form, and, further, since not all of the powder paint applied winds up on the article being painted, an overspray of various color powders is produced and collected. The difficulty, however, is that the powder collected after a number of body members have passed through a spray booth and have been painted a different color does not match any one of the individual colors sprayed.

We have found that one may take the oversprayed paint, regardless of its color, and reuse the same as an undercoat. For example, we have found that up to 40% of the thickness of the coating applied to an article may be the collected overspray. For example, if the total thickness of the coating to be applied is to be 2.0 mils, approximately 0.8 mils of the total coating's thickness may be the collected overspray regardless of its color. The 1.2 mil thickness topcoat will have sufficient hiding powder to cover over the color of the undercoat and develop the final coat color desired. The economy of using the oversprayed powder paint in this manner is apparent. One does not have to waste the oversprayed paint by discarding the same.

With reference now to the drawing, the method of painting an article with powder paint in accordance with the teaching of this invention will be disclosed. In general, articles, such as automobile bodies, are passed through a first spray booth 10 in which a first spray zone of powder paint is developed. The first spray zone is developed by using electrostatic spray equipment which is commercially available. This apparatus is not shown. The apparatus is fed from a first powder paint supply 12. The spray booth also has associated therewith a first overspray collector 14, which is connected to the powder supply by a return line 16. After moving through the first spray booth 10, the article passes through a first drying oven 18 in which the article and the powder paint thereon are heated to a temperature sufficient to fuse the paint on the article.

After passing through the first oven 18, the article is moved through a second spray booth 20. The second spray booth has a plurality of individual powder supplies 22—22, each containing a different color powder. These individual powder supplies are connectable by means of valves 24—24 to commercially available electrostatic spray equipment (not shown) associated with the second spray booth 20. The spray equipment establishes a second spray zone of powder paint in the second spray booth. An overspray collector 26 is associated with the second spray booth 20. This overspray collector collects the overspray from the second booth. The overspray collector 26 is connected, for example, by a pneumatic pipe 28 to the powder supply 12 for the first spray booth 10.

After passing through the second spray booth 20, the article moves through a second drying oven 30 where sufficient heat is applied to the article that the second coat is fused on top of the article's first coat of powder paint.

In operation of the method, an article passes through the first spray booth 10 and receives a coating thereon the color of which is determined by the color of material which is being fed to the first powder supply 12 from the overspray collectors 14 and 26. Up to approximately 40% of the total thickness of the coating desired on the article is applied in this first spray booth as an undercoat. the article then moves from the first spray booth through the oven 16 where the undercoat is fused thereon. The article, with its undercoating thereon, then passes into the second spray booth 20 wherein a powder coating composition of a selected color delivered from one of the powder supplies 22 is applied thereover by opening its associated valve and closing all others. This second coat makes up at least about 60% of the final thickness desired for the powder coating. After passing through the second spray booth, the article passes through the second drying oven 30 which once again heats the article and the coatings thereon to fuse them together and to produce the final painted article.

There has been disclosed herein a method of painting an article. In view of the teachings of this specification, those skilled in the art will be able to develop modifications of the invention which fall within the true spirit and scope thereof. It is intended that all such modifications also be included within the scope of the appended claims.

We claim:

1. A method of painting successive articles with powder paint which comprises the steps of:
   a. establishing a first spray zone of powder paint for applying powder paint on each of the successive articles;
   b. moving articles successively through the first spray zone so as to have a first coat of powder paint placed on each article;
   c. fusing the first coat of powder paint on each of the articles after the articles have been moved through the first spray zone thereby to form an undercoat on each of the articles;
   d. establishing a second spray zone of powder paint for applying a second coat of powder paint on each of the successive articles;
   e. spraying a powder paint having a desired color on each of the successive articles passing through the second spray zone;
   f. from time to time or from article to article changing the desired color sprayed in the second spray zone so that the successive articles are generally not of the same color;
   g. moving successive articles through the second spray zone to receive a coating of a second powder paint having a color selected for that article;
   h. fusing the second coating of powder paint on each of the successive articles after the articles have been moved through the second spray zone thereby to form a top coat on each of the successive articles;
   i. collecting any over sprayed powder paint from the second spray zone, the second over sprayed paint being nonhomogeneous in color because it contains a mixture of the top coat color powders used in the second spray zone;
   j. using the collected second over sprayed powder paint in the first spray zone as an undercoat powder paint;
   k. collecting the overspray of the first spray zone and respraying in the first spray zone.

* * * * *